United States Patent

[11] 3,587,164

| [72] | Inventor | Donald F. Davern |
| | | Palos Verdes Peninsula, Calif. |
| [21] | Appl. No. | 689,138 |
| [22] | Filed | Dec. 8, 1967 |
| [45] | Patented | June 28, 1971 |
| [73] | Assignee | Hughes Aircraft Company |
| | | Culver City, Calif. |

[54] AUTOMATIC TOOL CHANGER
14 Claims, 4 Drawing Figs.

| [52] | U.S. Cl. | 29/568 |
| [51] | Int. Cl. | B23q 3/157 |
| [50] | Field of Search | 29/568 |

[56] References Cited
UNITED STATES PATENTS

| 3,300,856 | 1/1967 | Daugherty | 29/568 |
| 3,233,321 | 2/1966 | Anthony | 29/568 |
| 3,286,344 | 11/1966 | Brainard et al. | 29/568 |
| 3,259,957 | 7/1966 | Stobbe | 29/26 |

Primary Examiner—Francis S. Husar
Attorneys—James K. Haskell and Earnest F. Oberheim ABSTRACT: An automatic tool changer for a machine tool which includes a pair of tool change arms, each of which is respectively pivotally mounted on opposite sides of a line between a selected tool in a tool change ready position and the tool spindle. The pair of tool change arms include tool grips from a stationary retracted position to extended positions engaging respective tools in the ready position and the tool spindle. The arms then move in a translational motion to axially displace the respective displace the respective tools to disengage them from the ready position and the tool spindle respectively. The tools then move angularly while retracted to clear one another in directions to interchange the tools between the tool ready position and the tool spindle and thereafter move in a direction to axially insert the tool in the ready position and tool spindles, after which the tool change arm retracts and moves to a stationary rest position.

Donald F. Davern,
INVENTOR.

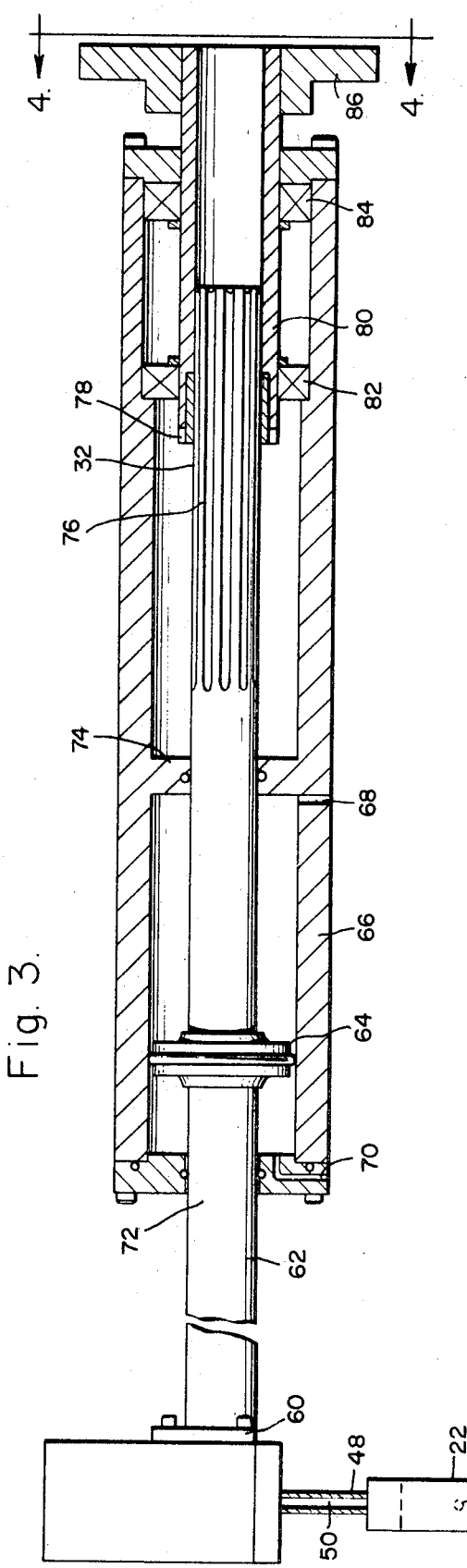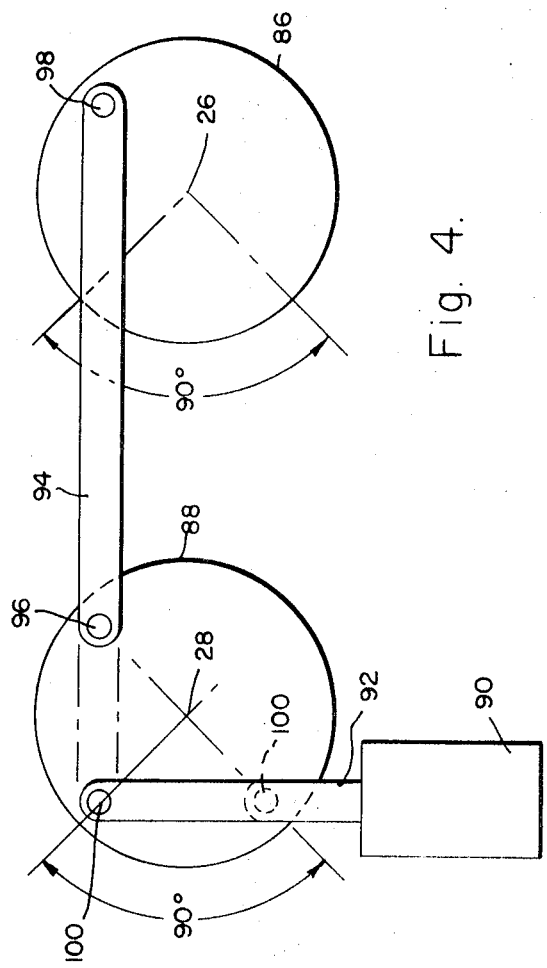
Fig. 3.
Fig. 4.
Donald F. Davern,
INVENTOR.
BY.
AGENT.

AUTOMATIC TOOL CHANGER

BACKGROUND OF THE INVENTION

This invention relates to machine tools and more particularly to a novel and improved automatic tool changer.

In the prior art automatic machine tools comprise a tool storage magazine which carries a plurality of rotary cutting tools for performing a variety of milling operations on a workpiece. During different times while performing the milling operations, it becomes necessary to use a different type of milling or cutting tool. When a tool change is desired, a new tool is provided by tool-changing apparatus. By proper indexing of a tool storage magazine, a predetermined tool is selected therefrom and inserted in the tool spindle while simultaneously the cutting tool which was previously in the spindle is removed and placed in its proper storage bin within the tool storage magazine.

These prior art automatic methods of changing the cutting tools or the like on the automatic machine tools comprised a complex operation which entailed a many step operation. Such types usually required many moving parts which must move in synchronism. For example, the prior art provides a dual-ended arm which rotates on an extendable member. When the machine is not operating, the dual-ended arm is at rest between the spindle and its ready position shaft which holds the replacement tool. When a tool change is desired and a new tool is placed in the ready position, the dual-ended arm rotates 90° on its extendable member in a counterclockwise direction, for example, and one end of the dual-ended arm grips the tool in the spindle and the other end grips the tool in the ready position. The extendable member of the arm extends so that the tools clear the ready position and the spindle chuck and thus unloads the spindle and the ready position tool carrier. The arm then rotates 180° in the same counterclockwise direction, for example. The extendable member then retracts and loads the ready position and the spindle. The dual arm then releases the tools and rotates back to its rest position 90° in a clockwise position.

Because of the fact that all of these motions in this prior art system are driven by pistons, a second tool change necessitates that all motions be in the opposite direction, that is, the initial rotation is clockwise, the next rotation is also clockwise and the final rotation of the arm to its rest position is counterclockwise. Because after each cycle the arm is 180° displaced from its previous position, it is necessary to provide in the control mechanism a memory of some sort to indicate to the control mechanism which of the two cycles the change arm is in.

Too, it should be pointed out that in the prior art dual-ended arm loaded with tools, a large amount of mass is present and the load is doubled thereby. The mass of the two tools and the doubling of the inertial effect, which causes an increase in the acceleration and deceleration forces, causes adverse torsional stresses in the extendable arm. Also, such increased mass which effects the acceleration during rotation of the arms may also cause oscillation and vibrations within the machine, which could affect the operation thereof and thereby decrease the speed of the change. These prior art machine tool changers have always been quite elaborate and expensive to manufacture and added to the cost of the overall machine.

It therefore becomes one object of this invention to provide a novel and improved tool changer for a machine tool.

Another object of this invention is to provide a novel and improved tool changer which requires less complexity and one which is faster in its performance.

Another object of this invention is to provide a novel and improved tool change for a machine tool which has a minimum of inertia during rotation movements during the actual tool changes.

Another object of this invention is to provide a novel and improved tool change which only needs a single cycle per operation and thus the control system used therewith does not require a memory for cycle position storage.

Another object of this invention is to provide a novel and improved tool changer which has a shorter turn radius of the tool change arm and thus, by shortening the moment arms, acceleration and deceleration of the tool change arms is much faster.

Another object of this invention is to provide a novel and improved tool changer which requires less rotational movement to make a tool change.

Another object of this invention is to provide a novel and improved tool changer which returns to its original rest position and thereby making all future changes in the identical cycle.

These and other objects, features and advantages will become apparent to those skilled in the art when taken into consideration with the following detailed description wherein like reference numerals indicate like or corresponding parts throughout the several views and wherein:

FIG. 3 is a section view of one of the dual extension shafts which carries the tool grip of this invention; and FIG. 4 is a view taken along the lines 4-4 of FIG. 3 and illustrates the coupling linkage between the dual extension shafts.

DESCRIPTION OF ONE PREFERRED EMBODIMENT

Figure 1:
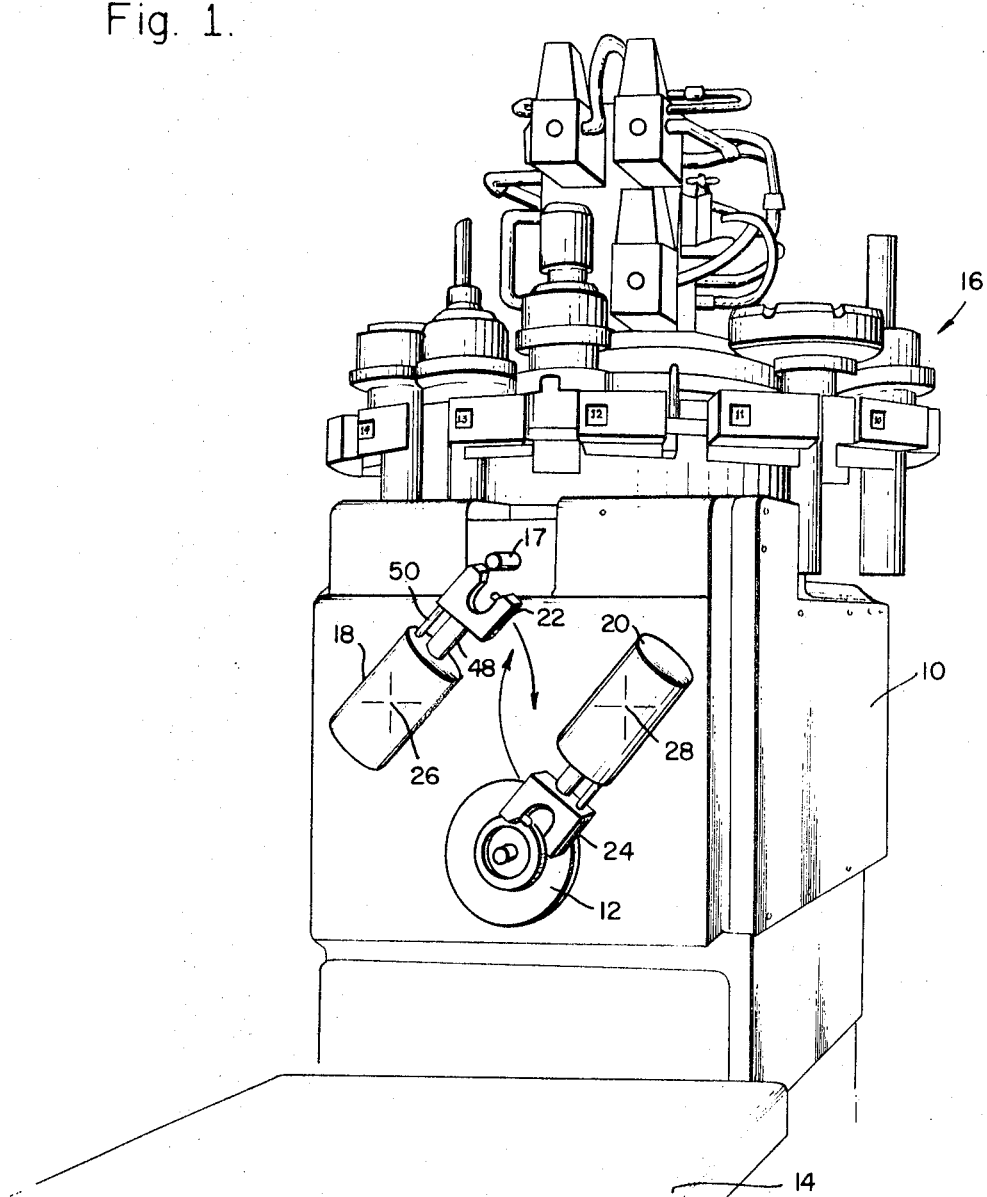
FIG. 1 is a front perspective view of the tool changer of this invention.

Referring now to FIG. 1 there is shown a view of a typical automatic machine tool within its housing and base member generally indicated by the numeral 10 and including a spindle 12 which rotates about its center axis and a slide for providing z axis movement for performing machining operations upon a particular workpiece. A worktable or carriage 14 is provided which is movable on its x and y axes and carries the workpiece so that a tool on the spindle 12 can perform its various machining operations thereon. A tool magazine 16 is provided to carry various tools for performing various cutting and milling operations upon the workpiece.

A typical machine tool which operates on this principle and the electronic control therefor is shown and described in U.S. Pat. No. 3,225,439, issued to Perry et al. and assigned to the assignee of this invention.

In normal operation, a tool is selected by previously known methods from tool magazine 16 and advanced to a tool ready position carriage 17 which rotates the tool in the headstock or spindle 12.

A pair of tool arms 18 and 20 having substantially U-shaped tool grips 22 and 24 respectively are mounted for pivotal movement about axes 26 and 28 respectively. The axis 26 represents a longitudinal axis of a sleeve 30, to be explained in more detail later, which at one end thereof is mounted the tool arm 18 and 20 and which at the other end is a splined shaft 32.

Figure 2:
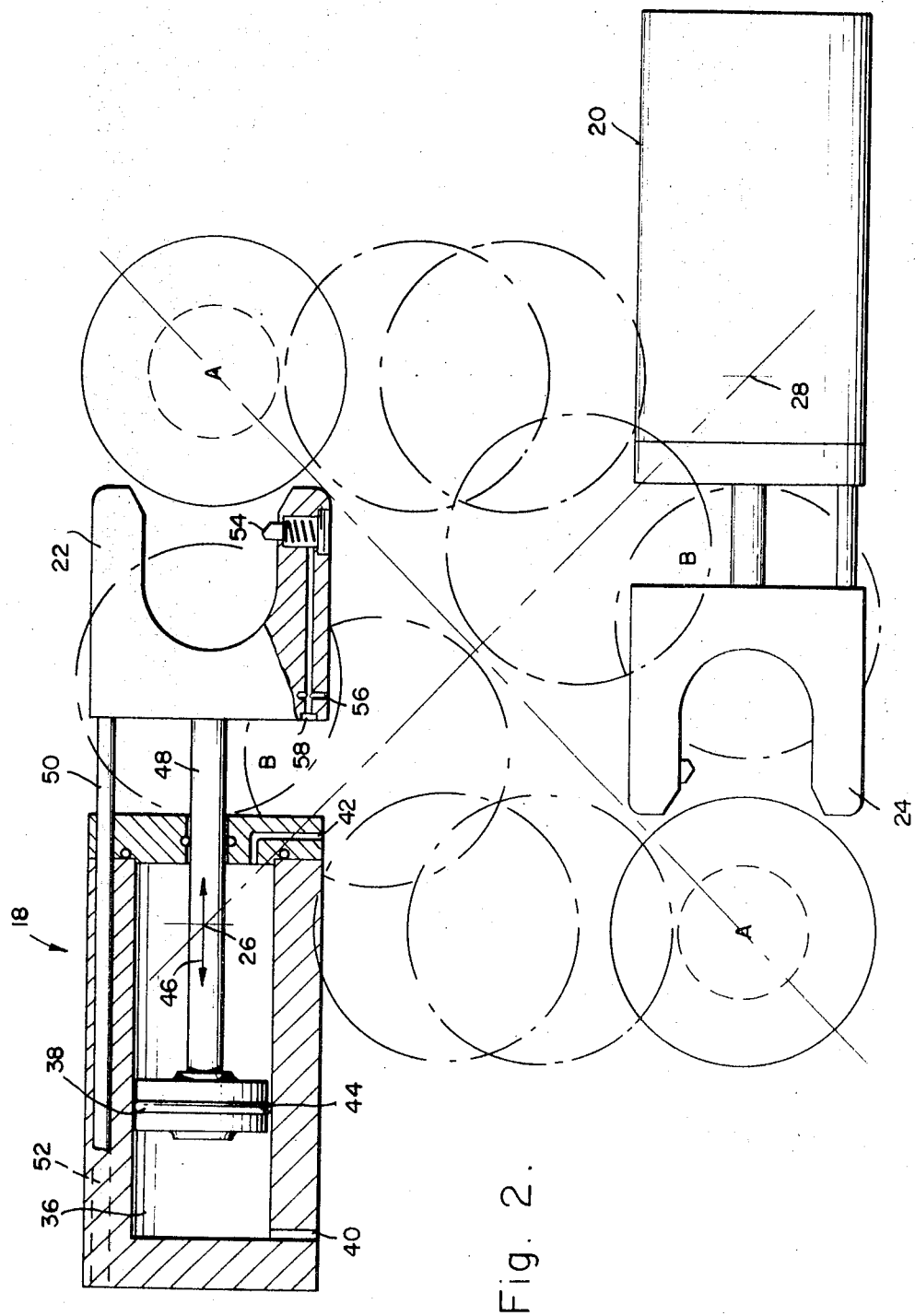
FIG. 2 is an illustration of the tool changer and the tool grips in partial section.

With reference now to FIG. 2, there is shown the pair of tool arms 18 and 20 wherein tool arm 20 is shown in a cutaway section view which exposes that the arm 18 comprises a cylinder 36 having a piston 38 therein which is movably positioned therein and is actuated by hydraulic fluid, for example, at ports 40 and 42. Piston 38 may have a seal 44 thereon for proper operation of the cylinder. As hydraulic fluid, for example, is applied alternately to ports 40 and 42, the piston 38 reciprocates within cylinder 38 in the usual manner in the direction as shown by arrows 46. Coupled to piston 38 is a shaft 48 which couples piston 38 to tool grip 22. A guide arm 50 is coupled to the grip 22 and runs longitudinal with the axis of shaft 48 in a sleeve 52 to assure the rigidity of the tool grip 22.

As previously stated, tool grip 22 may be U-shaped in form and it may include therein a detent 54 which may be hydraulically operated through ports 56 and 58, and operate in the usual manner.

Tool arm 20 and its associated grip 24 operate in the same manner as the tool arm 18 and tool grip 22 and by proper operation of the controls to ports 40 and 42 and ports 58 and 56 of ball detent 54. Tool grips 22 and 24 operate in synchronism with each other.

The hydraulic inlet/outlet lines and the controls therefor are deleted from this specification for clarity and simplification thereof.

Not only must tool grips 22 and 24 reciprocate on an axis longitudinal to tool arms 18 and 20, but also they must pivot in synchronism on their axes 26 and 28. Tool arms 18 and 20 must also be capable of extending away from housing 10 of the machine tool in a direction towards worktable 14. This is accomplished by the cylinder arrangement as shown in FIG. 3.

Note that tool arm 18, for example, is coupled by a flange 60 to a piston shaft 62 which operates on a piston 64 within cylinder 66. Ports 68 and 70 are provided for application of the proper hydraulic fluids to cause shaft 64 to reciprocate in a direction shown by arrows 72. This provides for the proper extension of the tool grip 22 away from housing 10 while a change mode is taking place.

It is also necessary that the tool arm 18 and 20 is rotatable through 90° rotation on the axes 26 and 28. This is accomplished by shaft 62 extending through cylinder wall 74 of sleeve 30 and having one end thereof formed in the shape of a spline 76 which engages gears 78 to allow the rotation of the 90° rotational movement and also the longitudinal movement as shown by arrow 72. Gear 78 is coupled to a hollow shaft 80 by a proper press fit or the like for rotation therewith and hollow shaft 80 is coupled to sleeve 30 by a pair of bearings 82 and 84. Hollow shaft 80 may be coupled to a flange or wheel which form a crank 86 which is coupled to suitable rotation means, as will be discussed in connection with FIG. 4. It should be understood, although not shown or explained herein, that an identical extendable and rotatable piston as shown in FIG. 3 must be provided for tool arm 20 and its associated tool grip 24 but is not shown herein because it should be a mere duplication in drawings and specifications. Crank 86 has an associate crank 88 for tool arm 20 and tool grip 24, respectively.

With reference now to FIG. 4 showing crank 86 and a similar wheel or flange forming a crank 88, a piston 90 has its shaft 92 coupled by proper linkage to crank 88 for causing a 90° angular rotation thereof. It should be understood that the 90° rotation of cranks 86 and 88 is used only as an example and if the center of rotation 26 and 28 of shaft 32 is moved relative to spindle 12 and ready position 17, the 90° angle of rotation will change accordingly. A further linkage 94 is coupled between crank 86 and crank 88 for causing similar motion between these two cranks to rotate on a 90° angle on axes 26 and 28. Although linkage of this type is shown herein, it should be understood that other types of gearing arrangements, such as direct gearing or a Morse chain drive or the like may be used. Linkage 94 is pivotally mounted to crank 86 and crank 88 on either end thereof, while linkage 92 is pivotally coupled to crank 88.

In operation with proper application of hydraulic fluids to their inlet and outlet ports in a controlled situation, tool grips 20 and 22 advance from a starting position as shown in FIG. 2 and advance towards the tools to positions A and extend from headstock or spindle 12 to remove the tools from spindle 12 and the ready position carriage 17 simultaneously. Tool grips 22 and 24 then retract to rotate positions B and the tool grips rotate through the 90° arcs as provided by piston 90 in FIG. 4 and appropriate linkages 92 and 94. Tool grips 22 and 24 then extend to an insert position and piston 64 then retracts to headstock to load spindle 12 and the ready position carriage 17 simultaneously. At this time, tool grips 22 and 24 retract to alternate starting positions and are positioned ready for the next tool change as called for by its proper control signal input which may be provided for by hand operation or the well known numerical control system.

It should be understood that with proper coupling of the linkage of this embodiment, a single arm of the pair of arms 18 and 20 may be independently moved to load, for example, an irregular-shaped tool. Thus there has been shown but one preferred embodiment of this invention which uses a pair of tool arms to accomplish in a simple and faster method the changing of a tool from its spindle to a ready position, at the same time removing the tool from the ready position to the spindle. Also, other modifications, alterations and additions of this embodiment can be made without departing from the spirit and scope of this invention.

Having thus described but one preferred embodiment of this invention,

I claim:

1. A machine tool comprising:
 a tool spindle, said spindle being operable with said machine tool and being capable of securing a work tool;
 a tool ready position carriage, said carriage being capable of securing a spare tool for further operation in said spindle;
 a pair of pivotally mounted arms, each arm of said pair being pivotally mounted between said spindle and said carriage at pivot points offset on either side of an axis extending therebetween and being extendable on an axis perpendicular to the axis between said spindle and said carriage; and
 a pair of tool grips mounted on each arm of said pair of arms and being capable of simultaneously gripping the tools in said spindle and said carriage.

2. A machine tool as defined in claim 1 and further comprising a tool magazine, said tool magazine being adapted to hold a plurality of tools for use in said spindle.

3. A machine tool as defined in claim 2 and further comprising means for transferring said tool from said magazine to said tool ready position and back at predetermined times.

4. In the machine tool as defined in claim 3 wherein said tool ready position carriage is movable from a tool ready position to a second position for transferring tools from said tool magazine to said ready position.

5. The machine tool as defined in claim 3 and further comprising means for extending said pair of tool arms on an axis between the pivot point of said tool transfer arm and said spindle and carriage.

6. A machine tool comprising:
 a tool spindle, said tool spindle being operable with said machine tool and being capable of securing a work tool;
 a tool ready position carriage, said carriage being capable of holding a spare tool; and
 a pair of pivotally mounted tool transfer arms, said tool transfer arms having respective pivot points offset to opposite sides of the axis between said spindle and said carriage, said tool transfer arms being reciprocally movable on respective axes perpendicular to the axis between said spindle and said carriage and parallel to the axis of said spindle, and said arms having respective tool grips for reciprocal movement longitudinally of the respective arms, and
 means for pivoting the respective tool transfer arms about their respective pivot points to bring the tool grips into alignment with said spindle and with said carriage, and means for extending said tool grips for gripping the tools at said spindle and at said carriage to effect transfer of tools therebetween.

7. The machine tool as defined in claim 6 and further comprising means for simultaneously rotating the respective tool transfer arms clockwise and counterclockwise respectively with the tool grips disposed in a retracted position relatively closer to the respective pivot points to provide clearance between the respective tools carried by the respective tool grips during the transfer operation.

8. In a machine tool: a tool spindle; a tool magazine, said tool magazine being adapted to hold a plurality of tools for use in said spindle; a tool ready position carriage having a ready position, said carriage being capable of receiving a predetermined tool from said plurality of tools of said tool magazine and holding the same at said ready position for subsequent transfer to said spindle; the improvement of which comprises a tool changer mechanism for simultaneously transferring tools from said carriage ready position to said spindle and from said spindle to said carriage ready position comprising a pair of pivotally mounted arms, said arms being pivotally mounted on respective pivot pints offset to either side of an axis extending between said spindle and said carriage ready position, said arms being reciprocally movable on respective axes parallel to said spindle; and a pair of tool grips each mounted on one of the arms of said pair and being capable of simultaneously engaging and gripping the tools respectively at said spindle and at said carriage ready position; each of said tool grips comprising a U-shaped member for engaging in gripping a tool during transfer thereof between the carriage ready position and the spindle;

means for extending the respective U-shaped members on respective axes normal to the respective pivot axes so as to engage the U-shaped members with tools at the spindle and at the carriage ready position.

9. In a machine tool as defined in claim 8, means for simultaneously rotating said arms on their respective pivot axes in clockwise and counterclockwise directions, respectively, during simultaneous transfer of one tool from the spindle to the carriage ready position and of another tool from the carriage ready position to the spindle.

10. In a machine tool as defined in claim 9, said rotating means for said arms being operable to rotate said arms through angles of substantially 90° during the transfer of tools between the spindle and carriage ready position.

11. In a machine tool including a tool spindle for holding a work tool, a worktable movable with relation to said spindle, a tool magazine for holding a plurality of work tools for use in said spindle at predetermined times and to perform different cutting operations, and a tool ready position carriage, said carriage being capable of receiving a predetermined tool from said tool magazine for subsequent use in said spindle; the improvement of which comprises a pair of tool change arms pivotally mounted on said machine tool and having respective spaced substantially parallel pivot axes which pivot axes extend substantially parallel to said spindle and being disposed at respective opposite sides of an axis extending between the tool ready position carriage and the spindle;

each of said tool change arms having means for engaging a tool for transfer thereof between said spindle and said tool ready position carriage and being reciprocally movable in direction parallel to the axis of said spindle; and means for rotating said tool change arms respectively in a clockwise direction and in a counterclockwise direction for transfer of one tool from the tool ready position carriage to the spindle and for transfer of a second tool from the spindle to the tool ready position carriage.

12. A machine tool comprising:

a tool spindle, said tool spindle being operable with said machine tool and being capable of securing a work tool;

a tool ready position carriage, said carriage being capable of holding a spare tool;

a pair of pivotally mounted tool change arms rotatable on respective pivot axes disposed substantially parallel to said spindle and at respective opposite sides of an axis extending between the spindle and the tool ready position carriage;

said tool transfer arms having respective tool grips mounted thereon capable of gripping tools during transfer; and means for shifting said tool grips toward and away from the tool spindle in respective first angular positions of the respective arms relative to the respective pivot axes so as to move tools between positions in axial alignment with the tool spindle and respective retracted positions closer to the respective pivot axes of the respective arms, means for rotating the respective arms while the respective arms are in the respective retracted positions, and means for shifting the tool grips toward and away from the carriage in respective second angular positions of the arms to transfer tools between the respective retracted positions relatively closer to the pivot axes of the respective arms and a position in axial alignment with the carriage.

said rotating means being operable to move one of the arms from its first angular position to its second angular position and to contemporaneously move the other of said arms from its second angular position to its first angular position.

13. In a machine tool: a tool spindle; a tool magazine; said tool magazine being adapted to hold a plurality of tools for use in said spindle; a tool ready position carriage, said carriage being capable of receiving a predetermined tool from said plurality of tools of said tool magazine for subsequent use in said spindle; an improved tool changer mechanism comprising:

a pair of pivotally mounted arms mounted for rotation about respective pivot axes and having respective tool grips mounted thereon and capable of simultaneously engaging and gripping the tools in said spindle and said carriage, the pivot axes of the respective arms being disposed substantially parallel to the axis of the spindle and being disposed on respective opposite sides of an axis extending between the tool ready position carriage and said spindle;

means for shifting each tool grip toward and away from the spindle in first angular positions of the respective arms and for shifting each tool grip toward and away from the carriage in second angular positions of the respective arms, the tool grips being retractable from positions in alignment with the spindle and carriage to retracted positions relatively closer to the pivot axes of the respective arms, and the tools being rotatable with the tool grips in the retracted positions respectively in clockwise and counterclockwise directions between the first and second angular positions for simultaneously transferring one tool from the spindle to the carriage and a second tool from the carriage to the spindle.

14. In a machine tool as defined in claim 13, a common power source for conjointly rotating one of the arms from its first position to its second position and the other of said arms from its second position to its first position, and the arms being movable through angles of substantially 90° in moving between said first and second positions thereof.